Feb. 16, 1926. Re. 16,267
A. STEVENS
PROCESS OF SEPARATING BUTYL ALCOHOL AND WATER
Original Filed March 10, 1920
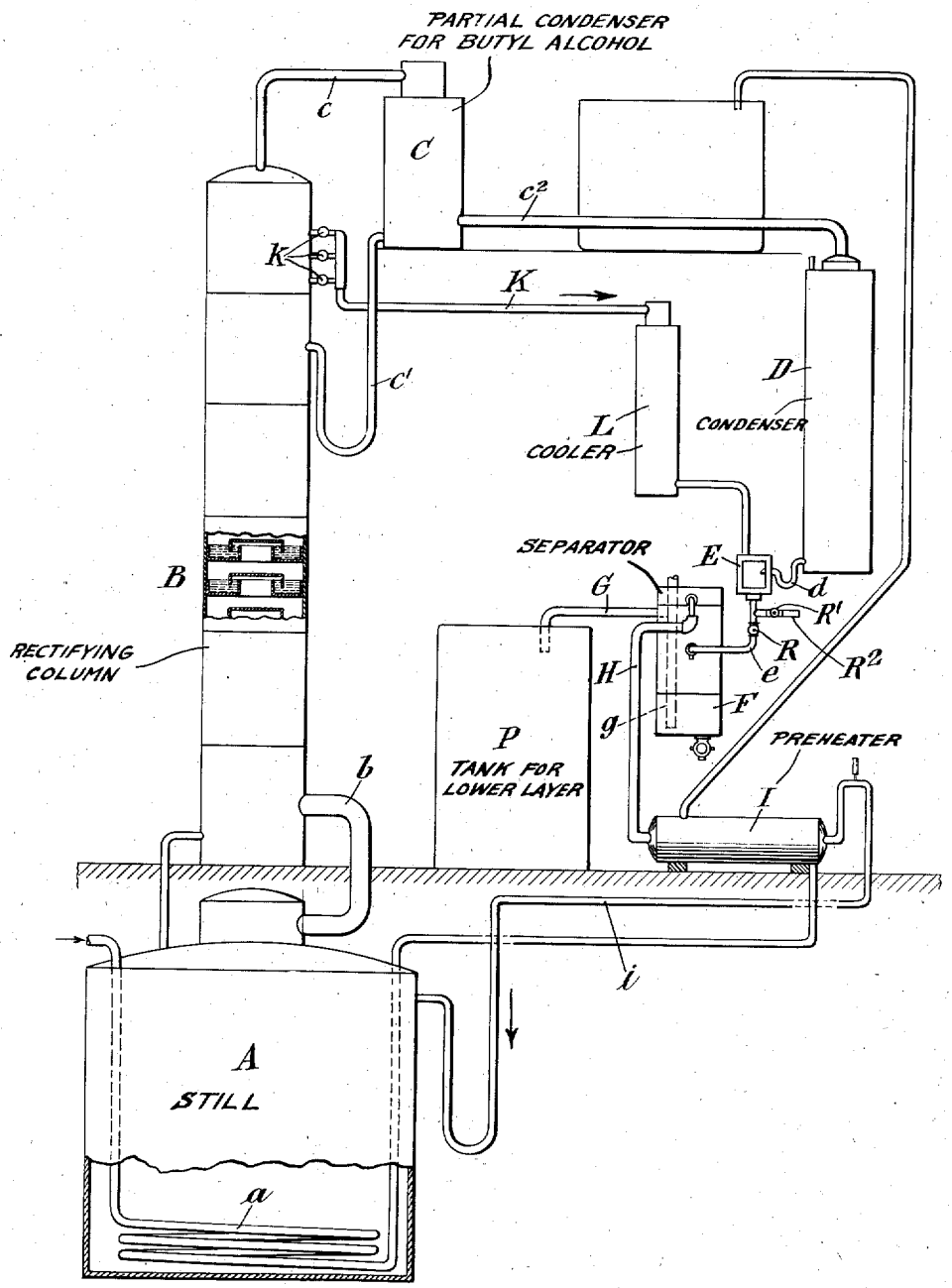
Inventor
Arthur Stevens
By Pindle & Wright, Neal & Beau.
Attorneys Reissued Feb. 16, 1926. Re. 16,267

UNITED STATES PATENT OFFICE.

ARTHUR STEVENS, OF BUFFALO, NEW YORK.

PROCESS OF SEPARATING BUTYL ALCOHOL AND WATER.

Original No. 1,394,232, dated October 18, 1921, Serial No. 364,697, filed March 10, 1920. Application for reissue filed October 9, 1924. Serial No. 742,672.

*To all whom it may concern:*

Be it known that I, ARTHUR STEVENS, a citizen of the United States, residing at Buffalo, in the county of Erie and State of New York, have invented a new and useful Improvement in Processes of Separating Butyl Alcohol and Water, of which the following is a specification.

This invention relates to a process of separating butyl alcohol from water to obtain a substantially anhydrous butyl alcohol.

The accompanying drawing shows diagrammatically an apparatus by means of which this process can be carried out.

In the following description the process will be described as applied to the separation of water from butyl alcohol, but it will be understood that this process can be used in connection with the separation of any other partly miscible compounds in which the mixture has a boiling point lower than the boiling points of either of the compounds.

A represents a still or kettle of the kind commonly used in connection with distilling apparatus, and to which the necessary heat is supplied by means of a steam coil *a*, and B represents the usual rectifying column into which the vapor from the still is conducted by means of a pipe *b*. The vapor, which passes through the rectifier, enters by means of a pipe or passage *c* into a partial condenser C, from which the compounds having the highest boiling points are returned by means of a pipe $c'$ to the rectifying column B and the remaining vapors are conducted by means of a pipe $c^2$ to a second condenser D. All of these parts have heretofore been used in connection with distilling apparatus, and the part of the process involving the use of this apparatus is not novel.

In the use of this portion of the apparatus the still or kettle A is charged with a mixture of butyl alcohol and water which contains approximately 20 per cent of water and 80 per cent of butyl alcohol, the greater part of which has a boiling point of about 90° C. The vapor of constant boiling point mixture which is discharged from the still upon boiling the liquid in the still may be said to contain a vapor consisting of approximately 30 per cent water and 70 per cent butyl alcohol boiling at 90° C., and a quantity of pure butyl alcohol vapor having a higher boiling point. The functions of the rectifying column B and the partial condenser C are to condense the pure butyl alcohol vapor in excess of the quantity required to form a constant boiling mixture and to return it to the still A, thus allowing the vapor of the constant boiling point mixture to pass into the final condenser D, where all the remaining vapor is condensed, forming again a liquid containing butyl alcohol and water, but which contains a larger percentage of water than the liquid in the still. This mixture separates on standing as the butyl alcohol and water are not miscible in the proportions in which they are present in this mixture. The liquid from the condenser D flows through a pipe *d* through a sight box E where the color and flow of the liquid can be observed. From the sight box the liquid flows through a pipe *e* to a separator F. The liquid reaching the separator will contain partly a mixture of approximately 20 per cent water and 80 per cent butyl alcohol which is the saturation point for water in butyl alcohol, and also a quantity of excess water. This water contains a small quantity of butyl alcohol, approximately 4 per cent and will collect in the bottom of the separator F, and the mixture of approximately 20 per cent water and 80 per cent butyl alcohol will collect in the separator F above the other liquid, which is mostly water. In order to effect a continuous separation of the two liquids in the separator, a pipe G is provided having a portion *g* extending into proximity to the bottom of the separator and the other end of which discharges the water to a suitable tank or the like P. This mixture of butyl alcohol and water is drawn off from the top of the separator by means of a pipe H which can be adjusted to the desired height and which conducts the mixture of butyl alcohol and water to a preheater tank I. In this tank the liquid is preferably heated by means of the steam dischaged from the steam coils *a* in the still A, and this mixture in the tank I, which contains approximately 20 per cent water and 80 per cent butyl alcohol is returned to the still A through a pipe *i*. The elimination of water from the separator F through the preheater to the still gradually increases the percentage of butyl alcohol in the still until all the water has been removed and this continuous process saves a large amount of labor and handling of materials.

The process of distillation is carried on continuously until practically all of the water has been removed from the butyl alcohol, at which time the temperature of the vapor in the upper portion of the rectifying column B will be approximately 117° C., namely the boiling point of butyl alcohol. When pure butyl alcohol passes through the sight box E, the liquid will be seen to be clear, the mixture of butyl alcohol and water being cloudy, due to the presence of free particles of water solution of the alcohol in the mixture. When, therefore, the temperature at the head of the rectifying column or the appearance of the stream of liquid in the sight box indicates that the contents of the still are substantially pure butyl alcohol, any one of a number of valves *k* at the top of the rectifying column may be opened, thus permitting pure butyl alcohol to flow through the pipe K into the cooler L. By closing a valve R in the pipe *e*, shutting off the flow of liquid to the separator F, and opening a valve R′ in a discharge pipe $R^2$, the pure butyl alcohol may be allowed to flow from the apparatus through the pipe $R^2$.

When the apparatus is charged and the tubes in the separator are adjusted to separate the desired compounds the process will be carried on with practically no attention until all of one compound has been separated, after which the remaining compound is distilled from the apparatus as described and a new charge is placed in the still. This process greatly reduces the cost of separation of compounds of this kind. The continuous process utilizes very efficiently the heat in the steam by means of the preheater in which the mixture is heated before being returned to the still.

I claim as my invention:

1. The process of separating water from a homogeneous aqueous butyl alcohol mixture which comprises distilling the mixture to evolve a constant boiling mixture, condensing the latter and allowing it to settle in two layers, returning the upper layer to the original mixture undergoing distillation and eliminating the lower layer from the process.

2. The process of separating water from a homogeneous, aqueous, butyl alcohol mixture, which comprises distilling the mixture so as to evolve vapors containing a constant boiling mixture, partially condensing the vapors so as to leave a residue of vapor consisting substantially of the constant boiling mixture, and returning the condensate thus obtained to the still, condensing the constant boiling mixture remaining, and allowing it to settle in two layers, returning the upper layer to the original liquid undergoing distillation, and eliminating the lower layer from the process.

3. The process of eliminating the water from a body of homogeneous aqueous butyl alcohol mixture, which comprises distilling the said mixture to evolve a constant boiling mixture, condensing the latter and allowing it to settle into two layers, removing the lower layer, returning the upper layer to the main body undergoing distillation, and thus continuing the distillation until all of the water is removed and the body of liquid in the still consists of anhydrous butyl alcohol.

4. The process of separating water from a mixture containing about 20% water and 80% butyl alcohol, consisting in distilling the mixture to evolve a constant boiling mixture, allowing the same to settle in two layers, removing the upper layer comprising a mixture of butyl alcohol and water in the respective proportions of 80%, and 20%, and returning it to the still.

5. The process of separating water from a mixture containing about 80% butyl alcohol and 20% water, consisting in continuously distilling the mixture so as to evolve vapors containing a constant boiling mixture of 30% water and 70% butyl alcohol, partially condensing the vapors so as to leave a residue of vapor consisting substantially of the constant boiling mixture, separately returning to the still the condensate thus obtained, condensing the constant boiling mixture remaining, and continuously returning to the still the condensate layer having about 80% butyl alcohol therein.

Witness my hand this 22nd day of September, 1924.

ARTHUR STEVENS.